US006866731B2

(12) United States Patent
Kemkes

(10) Patent No.: US 6,866,731 B2
(45) Date of Patent: Mar. 15, 2005

(54) PROCESS FOR STRUCTURING A PAPER POSTER OR PAPER PHOTOGRAPH

(76) Inventor: Jürgen Kemkes, Budapester Str. 7-9, 10787 Berlin (DE)

( * ) Notice: Subject to any disclaimer, the term of this patent is extended or adjusted under 35 U.S.C. 154(b) by 252 days.

(21) Appl. No.: 10/067,108

(22) Filed: Feb. 4, 2002

(65) Prior Publication Data

US 2002/0104607 A1 Aug. 8, 2002

(30) Foreign Application Priority Data

Feb. 2, 2001 (DE) ........................................ 101 06 285

(51) Int. Cl.[7] ................................................ B32B 31/20

(52) U.S. Cl. ......................... 156/58; 156/219; 156/220; 156/222; 156/323

(58) Field of Search ............................ 156/58, 59, 196, 156/209, 219, 220, 222, 223, 232, 240, 221, 323; 264/293; 40/800; 101/17, 32, 33, 34

(56) References Cited

U.S. PATENT DOCUMENTS 154,576 A * 9/1874 Barnet ........................ 425/398
615,026 A * 11/1898 Hulbert ....................... 156/59
2,117,795 A 4/1938 Eriksen
3,856,592 A * 12/1974 Giorgi ......................... 156/59
3,880,686 A * 4/1975 Robinson ..................... 156/59
3,964,946 A * 6/1976 Falk ............................ 156/59
4,971,743 A * 11/1990 Lang .......................... 264/132
5,116,562 A * 5/1992 Lang .......................... 264/132
5,182,063 A * 1/1993 Lang et al. ................. 264/132
5,721,041 A * 2/1998 Baratto .................... 428/195.1

FOREIGN PATENT DOCUMENTS

DE 3102409 C2 3/1985

* cited by examiner

*Primary Examiner*—Gladys JP Corcoran
(74) *Attorney, Agent, or Firm*—Pendorf & Cutliff

(57) ABSTRACT

The process in accordance with the invention for producing a three-dimensional surface structure in a paper poster or paper photograph is used especially for the plastic reproduction of paintings. A paper poster or paper photograph is thereby placed face down onto a structured matrix and fixed, the paper poster or paper photograph being equal in size to or smaller than the matrix. A canvas is then adhered onto the back surface of the poster or photograph and the resulting stack of layers cold pressed. After the pressing, the structured laminate of paper poster or paper photograph and adhered canvas is then removed from the matrix, mounted under tension onto a frame, and sealed. In the preferred embodiment, the matrix is an imprint of the original painting and the paper poster is a print of the original painting in the original size.

9 Claims, 1 Drawing Sheet

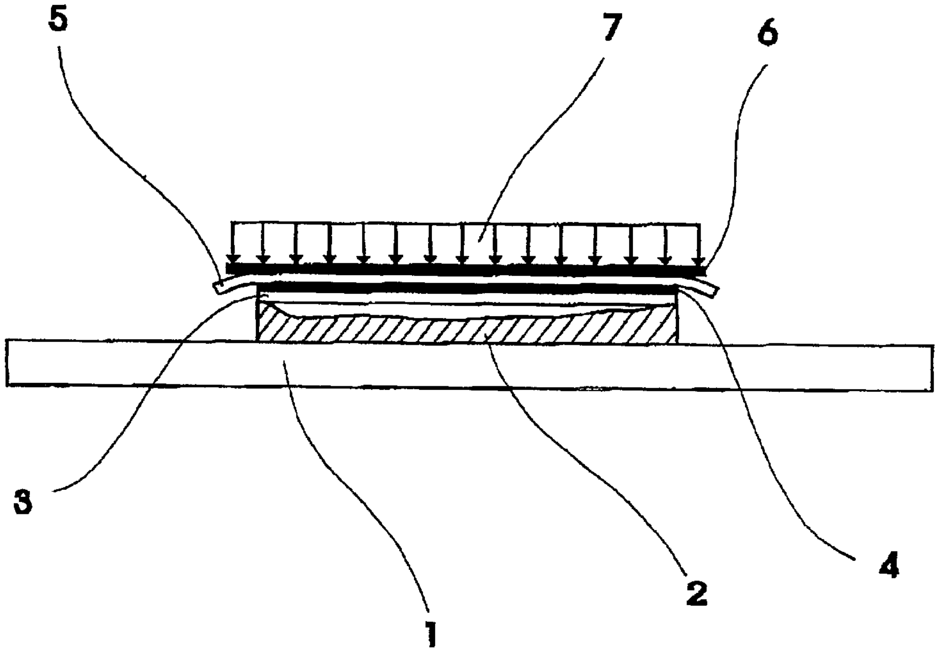
5
7
6
3
1
2
4

PROCESS FOR STRUCTURING A PAPER POSTER OR PAPER PHOTOGRAPH

FIELD OF THE INVENTION

The invention relates to a process for the structuring of a paper poster or paper photograph, especially for the plastic reproduction, true to the original, of oil paintings.

BACKGROUND ART

Efforts to reproduce paintings as true to the original as possible have been known since the early days of multi-color printing. Today, the 'dressing' of refined art prints, as a specialized area, has reached a never anticipated high level.

A process for the imitation of paintings is known from U.S. Pat. No. 2,117,795, wherein a canvas is initially provided with a relief-type surface structure. At the locations where in accordance with the original the picture or the colors are to lie higher, the canvas is covered with a thick layer of a settable substance, for example, a mixture of oil and zinc oxide. In order to facilitate the application of the settable substance, a template is used which is perforated corresponding to the more elevated regions of the image. By application of a paint, which flows through the perforations onto the substratum, the regions subsequently to be covered with the settable material can be exactly determined. After the hardening of the layer, the image is transferred. This process is expensive and insufficiently reflects the brush and palette knife strokes of the original.

Furthermore, a process for the manufacture of images with a smooth surface is known from DE 31 02 409 C2. A layer of paint of white color mixed with chalk is thereby applied onto a canvas provided with adhesive, which color dries under the formation of fine cracks. After a mechanical smoothing, the print color is peeled from an overlaid paper image by way of solvents and adhesive and transferred to the surface with the fine cracks. Such pictures convey an impression of age. It is a disadvantage that they have a smooth surface.

SUMMARY OF THE INVENTION

It is an object of the invention to provide a method of transferring a reproduction true to the original onto a canvas of a weave according to the time of creation of the painting, whereby the characteristic 'ductus' of the brush and palette knife strokes noticeably protrudes from the surface.

This object is achieved in that a paper poster or photograph is applied face down onto a structured matrix, preferably an imprint of the original painting, and three-dimensionally structured by cold pressing against the matrix.

In the process in accordance with the invention for the structuring of a paper poster or paper photograph, a paper poster or paper photograph is applied with the image surface down onto a structured matrix and fixed thereto, the paper poster or paper photograph being of a size equal to or smaller than the matrix, a canvas is adhered to the back surface of the no; poster and the so laminated matrix cold surface pressed, the paper poster or paper photograph is after the pressing removed from the matrix together with the canvas and tensioned in a frame, and a sealing is carried out in the known manner.

The matrix in the preferred embodiment is an imprint of the original painting and the paper poster represents a print of the original painting in the same size as the original. This manner of manufacture creates the highest possible correspondence between the color-plastic reproduction achieved and the original. The respective structure of the underbase of the painting as well as all further details of the painting surface such as brush stroke, relief, signature, finest aging cracks are deceptively realistically reproduced.

In a simplified version of the invention, the matrix only has a canvas structure and the paper poster or paper photograph is of a size equal to or smaller than the matrix.

It is preferably pressed at a pressure of 150–200 kp/cm$^2$. Synthetic resin has proven to be an advantageous material for the matrix.

A canvas is preferably used which has a paper cover onto which the adhesive for connection of the poster/photo with the canvas is applied. This prevents the adhesive being pressed through the canvas. Furthermore, the use of a water soluble adhesive has proven advantageous, since it softens the canvas. Also, after the pressing, the paper poster or paper photograph with adhered canvas is preferably tensioned on a frame in the damp condition caused by the water soluble adhesive.

In another preferred embodiment of the invention, an elastic mat of even thickness is inserted between the even press ram and the canvas for the pressing operation, in order to improve the picture structuring. The pressing step can also be repeated several times.

BRIEF DESCRIPTION OF THE DRAWING

The invention will be further described in the following by way of example only and with reference to the sole attached drawing FIGURE which shows a cross-section of the various layers stacked above one another during the pressing operation.

DETAILED DESCRIPTION OF THE PREFERRED EMBODIMENT

The FIGURE shows the process condition prior to the surface pressing. Several layers are stacked in the press between the press table 1 and the press ram 7. A matrix 2 bearing an imprint of the original painting is supported on the press table 1. Protrusions in the original painting are depressions in the matrix 2 and vice versa. Methods for forming imprints of this type are well known in the art and need not be described in detail herein. A paper poster 3 of a size equal to or smaller than the matrix 2 is placed with its image side down onto the matrix 2, and fixed. Because of the corresponding scale of matrix 2 and paper poster 3, the corresponding picture points of the smooth paper poster 3 are point for point located above those of the matrix 2.

This is followed by a layer of adhesive 4 between canvas 5 and paper poster 3. An elastic mat 6 forms the final layer of the stack in direction of the press ram 7. The canvas 5 is larger than the paper poster 3, since the painting reproduction with three-dimensional surface structure is subsequently mounted under tension onto a frame (not illustrated).

At least one cold surface pressing operation is carried out in this condition of the stack. The paper poster 3 with the canvas 5 adhered thereto is subsequently removed from the matrix 2, mounted under tension onto a frame, and sealed in a manner well known in the art or painting preservation.

What is claimed is:

1. A process for producing a three-dimensional surface structure in a paper copy of a picture, the paper copy being in the form of a paper poster or paper photograph having an image side, comprising the steps of:

placing the paper copy with the image side down onto a matrix having a surface structure and fixing the paper copy to the matrix, the paper copy being equal in size to or smaller than the matrix;

adhering a canvas onto the back surface of the paper copy to form a laminate;

positioning an elastic mat of uniform thickness between a press ram and the canvas;

cold surface pressing, using the press ram, the laminate into the matrix at least once to structure, the laminate with the surface structure of the matrix;

removing the resulting structured laminate of the paper copy and the adhered canvas, after the pressing, from the matrix and mounting the structured laminate under tension onto a frame; and sealing the structured laminate.

2. The process according to claim 1, wherein the matrix is an imprint of an original painting and the paper copy is a print of the original painting in its original size.

3. The process according to claim 1, wherein the matrix has a canvas structure.

4. The process according to claim 1, wherein the pressing step is carried out at a pressure of 150–200 kp/$cm^2$.

5. The process according to claim 2, wherein the matrix is made of synthetic resin.

6. The process according to claim 1, wherein the canvas has a paper covering providing an adhesion surface between the paper copy and the canvas.

7. The process according to claim 1, wherein a water soluble adhesive is used for adhering the canvas onto the paper copy.

8. The process according to claim 7, wherein the laminate of paper copy and canvas is, after the pressing, mounted under tension onto a frame while still damp from the water soluble adhesive.

9. The process according to claim 1, wherein the sealing is carried out with a varnish applied at a preselected thickness for producing a desired gloss.

* * * * *